United States Patent
Aoki et al.

(10) Patent No.: US 9,218,057 B2
(45) Date of Patent: Dec. 22, 2015

(54) VEHICULAR DISPLAY SYSTEM

(71) Applicant: HONDA MOTOR CO., LTD., Tokyo (JP)

(72) Inventors: Koji Aoki, Wako (JP); Yoshimitsu Ishida, Wako (JP); Masaru Nakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/070,723

(22) Filed: Nov. 4, 2013

(65) Prior Publication Data

US 2014/0125583 A1 May 8, 2014

(30) Foreign Application Priority Data

Nov. 8, 2012 (JP) ................................. 2012-246666

(51) Int. Cl.
*G06F 3/01* (2006.01)
*B60K 37/02* (2006.01)

(52) U.S. Cl.
CPC ................ *G06F 3/013* (2013.01); *B60K 37/02* (2013.01); *B60K 2350/352* (2013.01); *B60K 2350/901* (2013.01); *B60K 2350/962* (2013.01)

(58) Field of Classification Search
None
See application file for complete search history.

(56) References Cited

U.S. PATENT DOCUMENTS

2007/0176797 A1* 8/2007 Rhodes et al. ........... 340/995.15
2012/0215403 A1* 8/2012 Tengler et al. .................. 701/36

FOREIGN PATENT DOCUMENTS

| JP | 2010-006362 | 1/2010 |
| JP | 2010-100260 | 5/2010 |
| JP | 2010-208359 | 9/2010 |
| JP | 2011-037310 | 2/2011 |
| JP | 2011-111123 | 6/2011 |
| JP | 2012-187190 | 10/2012 |

OTHER PUBLICATIONS

Japanese Office Action dated Apr. 7, 2015 with English translation, 6 pages.
European Search Report dated Mar. 17, 2015, 6 pages.
Japanese Office Action with partial English translation dated Aug. 19, 2014, 5 pages.

* cited by examiner

*Primary Examiner* — Kenneth B Lee, Jr.
(74) *Attorney, Agent, or Firm* — Rankin, Hill & Clark LLP

(57) ABSTRACT

A vehicular display system includes a mobile device having a mobile display part and adapted to be disposed in a predetermined position in a vehicle. The mobile display part is configured to display contents such that at least one of a display size and a display position of each of the contents is changed in accordance with positions of eyes of a driver sitting on a driver's seat in the vehicle with respect to a reference position in the vehicle. Preferably, the mobile device has an imaging unit for picking up an image and recognizes the positions of the driver's eyes and the reference position from the image picked up by the imaging unit. The vehicular display system may further include a vehicle on-board unit fixedly mounted in the vehicle.

4 Claims, 9 Drawing Sheets

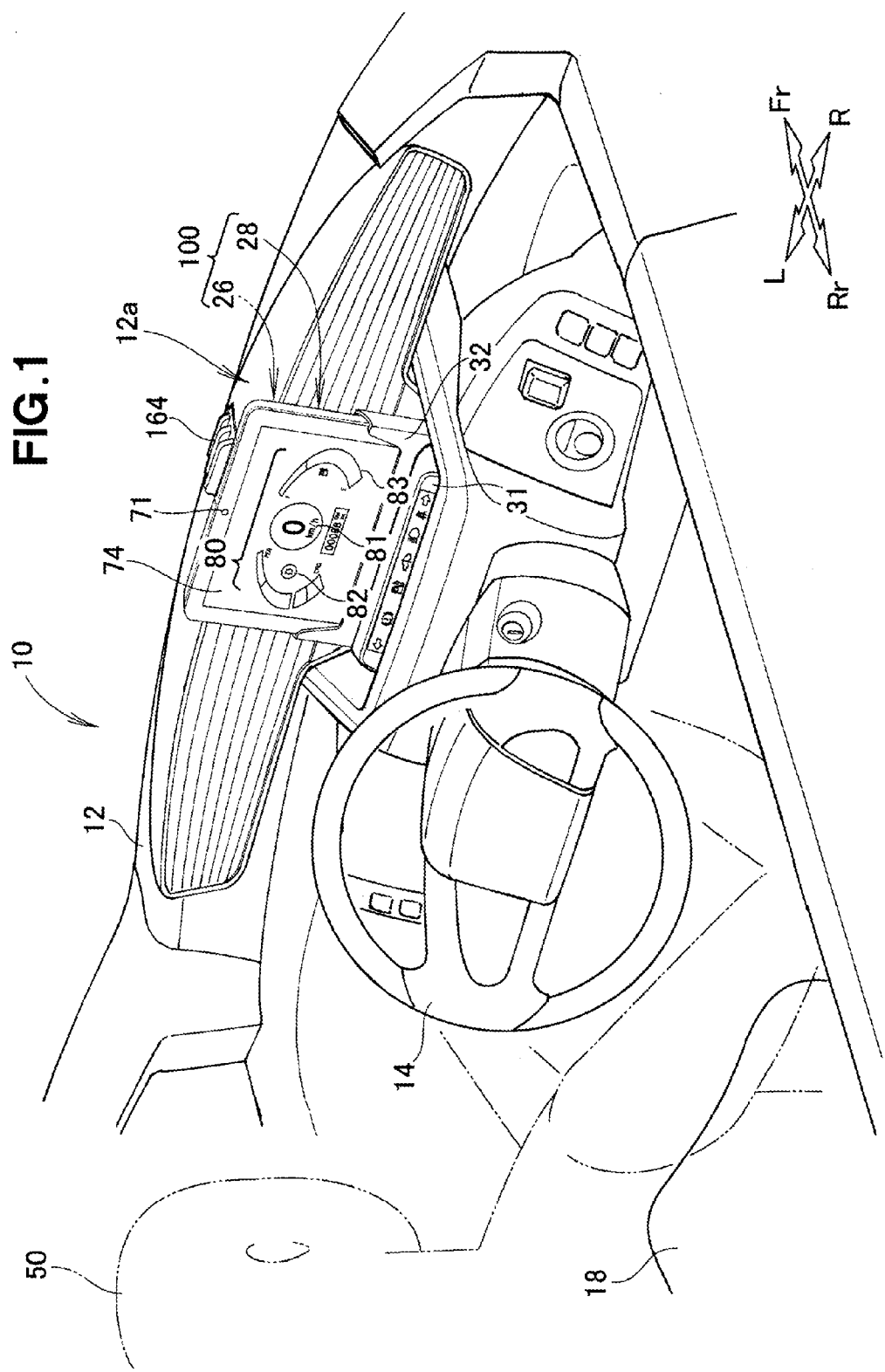

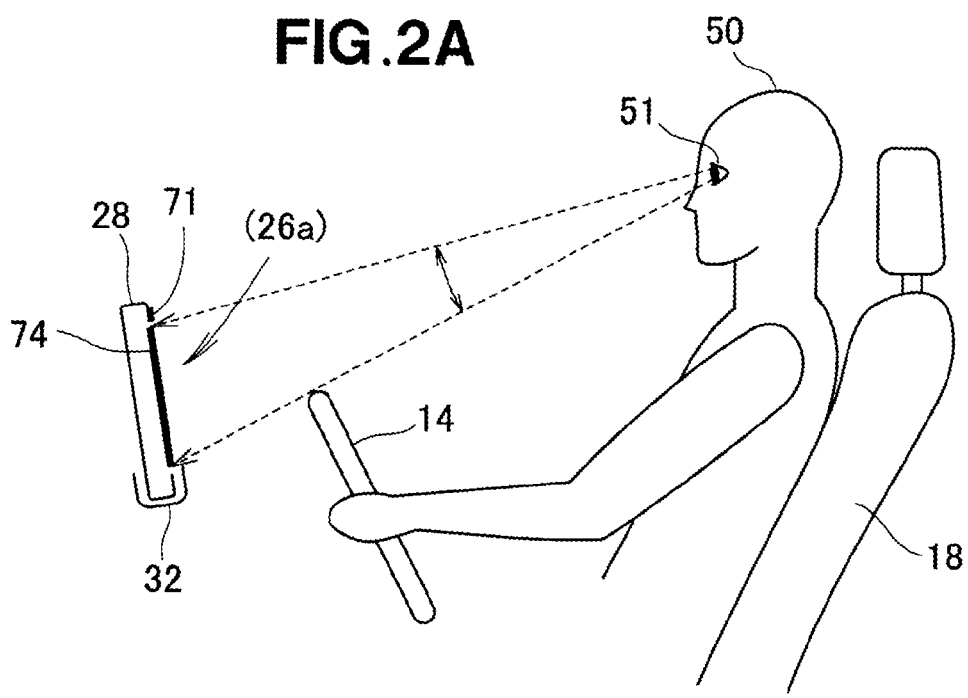
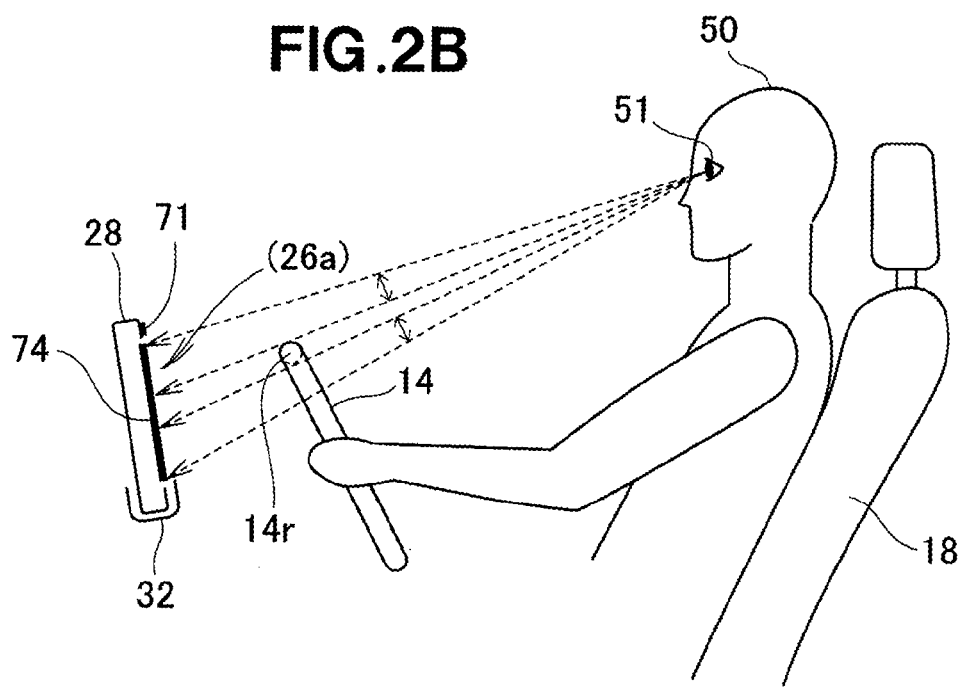

| # VEHICULAR DISPLAY SYSTEM

TECHNICAL FIELD

The present invention relates to a vehicular display system for displaying information to a driver or vehicle occupant in a vehicle.

BACKGROUND ART

A vehicular display device constituting a vehicular display system is disclosed, for example, in Japanese Patent Application Laid-Open Publication (JP-A) No. 2011-111123, which displays a first image (containing information of a vehicle speed and warnings, for example) on an HUD (head-up display) and a second image (containing information of a speed meter and a tachometer, for example) on a meter by using a single light source unit such as a light-projector.

In the vehicular display device disclosed in JP 2011-111123A, however, an ECU (electronic control unit) for controlling the light source unit must include a luminance value adjustment means which controls the luminance of the light source unit based on the higher illuminance of a cabin-outside illuminance and a cabin-inside illuminance detected respectively by an external illuminometer and an internal illuminometer, and a pixel value adjustment means which performs, based on the lower illuminance of the detected cabin-outside illuminance and the detected cabin-inside illuminance, control to reduce the pixel value of one of the first image and the second image to be lower than the pixel value of the other. In other words, the ECU must have a complex configuration, and the manufacturing cost of the vehicular display device is inevitably increased.

To solve this problem, an improved vehicular display system has been proposed by the present inventors which can reduce the manufacturing cost of the vehicular display device by using a mobile device (such as a tablet device) having a mobile display part, instead of the HUD. In the improved vehicular display system, however, a driver might be unable to see part of a display screen depending on a position in which the mobile device is disposed. Not only in the improved vehicular display system, this kind of problem would occur when the mobile device is used together with a vehicle on-board unit in a vehicle.

SUMMARY OF THE INVENTION

It is therefore an object of the present invention to provide a vehicular display system which has a display screen with improved visibility.

According to the present invention, there is provided a vehicular display system comprising: a mobile device having a mobile display part and adapted to be disposed in a predetermined position in a vehicle, wherein the mobile display part is configured to display contents such that at least one of a display size and a display position of each of the contents is changed in accordance with positions of eyes of a driver sitting on a driver's seat in the vehicle with respect to a reference position in the vehicle.

By using the mobile device (such as a tablet device) having the mobile display part, the manufacturing cost of the vehicular display system can be reduced. Further, with the mobile display part being controlled by the mobile device itself, the display part can be readily controlled. Furthermore, even when the mobile device is disposed in the predetermined position in the vehicle such that it is hard to see the whole contents displayed on the mobile display part of the mobile device, at least one of the display size and the display position of each of the contents is changed in accordance with the positions of the driver's eyes (visual range of the driver), thereby allowing the driver to easily see the contents displayed on the mobile display part.

Preferably, the mobile device has an imaging unit for picking up an image and recognizes the positions of the driver's eyes and the reference position from the image picked up by the imaging unit.

The positions of the driver's eyes can be obtained, for example, by means of eye glasses having a built-in IC tag for sending an RFID (radio frequency identification) and a space network sensor for detecting the IC tag while the driver wears the eye glasses. However, many of the mobile devices have the imaging unit (camera unit) for picking up images, and in the invention the mobile device is used to obtain the positions of the driver's eyes and the reference position by processing the picked-up image. By using the mobile device having the imaging unit, the increase of the manufacturing cost of the vehicular display system can be suppressed.

Preferably, the predetermined position where the mobile device is disposed is present on an opposite side of the driver with respect to a steering wheel of the vehicle, and said at least one of the display size and the display position of each of the contents is changed on the basis of whether or not the mobile display part is obstructed from view by the steering wheel when the mobile display part is viewed from the positions of the driver's eyes.

Depending on the position in which the mobile device is disposed, it might be hard to see the contents displayed on the mobile display part of the mobile device because of the steering wheel in front of the mobile display part. Therefore, the mobile display part is configured to display the contents such that at least one of the display size and the display position of each of the contents is changed when the contents displayed on the mobile display part is obstructed from view by the steering wheel.

Preferably, the vehicular display system further comprises a vehicle on-board unit fixedly mounted in the vehicle, the contents comprise a vehicular content representing vehicular information collected by the vehicle on-board unit and a mobile content representing mobile information produced independently by the mobile device, and the at least one of the display size and the display position of each of the contents is changed such that the vehicular content is displayed on one of an upper side and a lower side of an obstructing line where the mobile display part is obstructed from view by the steering wheel, and the mobile content is displayed on the other of the upper side and the lower side of the obstructing line.

Since the mobile display part of the mobile device is configured to display the vehicular information (vehicular content) including a vehicle speed, when the mobile device is disposed in the vehicle, the driver can see the vehicular information (vehicular content) including the vehicle speed on the mobile display part of the mobile device instead of the vehicle on-board unit (such as a meter unit). The vehicular information including the vehicle speed is obtained by sensors within the vehicle such as a wheel speed sensor, not by sensors within the mobile device such as an acceleration sensor, and thus the driver can drive the vehicle safely.

Further, since the mobile display part of the mobile device displays the vehicular information (vehicular content) obtained from the vehicle and, concurrently, the mobile information (mobile content) produced independently by the mobile device, the driver can also see on the mobile display part the mobile information (mobile content) including navigation information and music information, for example.

When the steering wheel is viewed from a point of view of the driver, the mobile display part is obstructed from view or divided by the steering wheel. In other words, the vehicular information (vehicular content) and the mobile information (mobile content) displayed on the mobile display part are located respectively on one side and the other side with respect to the steering wheel, thereby allowing the driver to easily see and obtain both the vehicular information (vehicular content) and the mobile information (mobile content).

Preferably, the vehicular content is displayed on the upper side of the obstructing line, and the mobile content is displayed on the lower side of the obstructing line.

When the driver sees while driving the content displayed on the lower side of the obstructing line, the movement of the sight of the driver is relatively large. Conversely, the movement of the sight of the driver is smaller when the driver sees the content displayed on the upper side of the obstructing line. Thus, the vehicular information (vehicular content) including the vehicle speed is located on the upper side of the obstructing line, thereby allowing the driver to concentrate on driving the vehicle.

Preferably, the reference position is to be lower than the positions of the driver's eyes, and the at least one of the display size and the display position of each of the contents is changed such that the display size is reduced or the display position is lowered as the positions of the driver's eyes become closer to the reference position.

When the reference position is lower than the positions of the driver's eyes, e.g. when the driver of small height is sitting on the driver's seat, the positions of the driver's eyes are close to the reference position, and the obstructing line gets high. When the obstructing line is high, the display size of each of the contents can be reduced, or the display position of each of the contents can be lowered, to thereby allow the driver to easily see the contents.

BRIEF DESCRIPTION OF THE DRAWINGS

FIG. 1 is a perspective view showing the interior of a vehicle equipped with a vehicular display system according to the present invention;

FIGS. 2A and 2B are side views showing positional relationships between a mobile device of the vehicular display system, a steering wheel of the vehicle, and driver's eyes;

DESCRIPTION OF THE PREFERRED EMBODIMENT

Figure 3A:
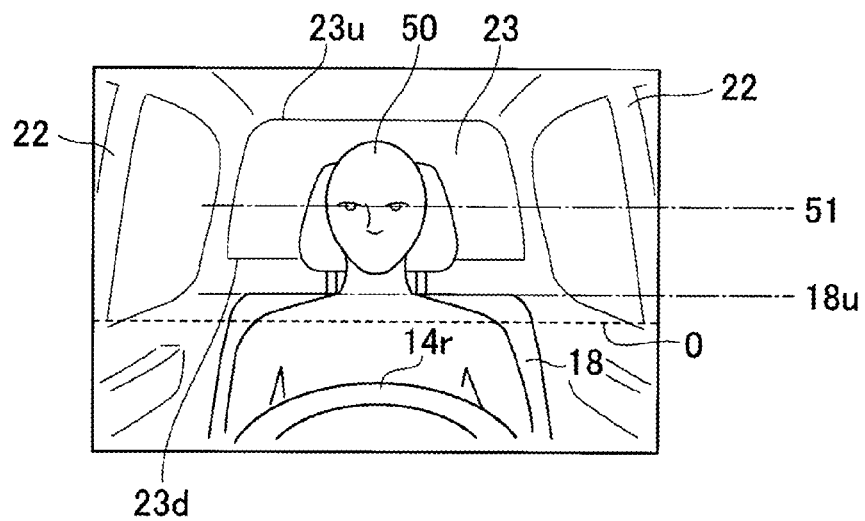
FIG. 3A is a view showing an image picked up by an imaging unit of the mobile device.

One preferred embodiment of the present invention will be described in detail below, by way of example only, with reference to the accompanying sheets of drawings.

As shown in FIG. 1, a vehicular display system 100 includes a mobile device 28 disposed in a predetermined position in a vehicle 10 and a vehicle on-board unit 26 fixedly mounted on the vehicle 10. As the predetermined position in the vehicle 10, the mobile device 28 is disposed, for example, in a position between a driver 50 of the vehicle 10 and a vehicular display part 26a (see FIG. 4) of the vehicle on-board unit 26. More specifically, the mobile device 28 is held by a holder 32, and the vehicular display part 26a of the vehicle on-board unit 26 is disposed behind the mobile device 28. The mobile device 28 is configured to display various items of information, e.g. vehicular information (vehicular content) 80 collected from the vehicle 10 and mobile information (mobile content) 91 produced independently by the mobile device 28.

Depending on the position in which the mobile device 28 is disposed, the driver 50 cannot easily see the whole contents 80, 91 displayed on a mobile display part 74 of the mobile device 28. Therefore, the mobile display part 74 is configured to display the contents 80, 91 such that at least one of a display size and a display position of each of the contents 80, 91 is changed in accordance with positions of eyes 51 (FIG. 2) of the driver 50 sitting on a driver's seat 18 in the vehicle 10. As a result, the driver 50 can easily see the contents displayed on the mobile display part 74.

The vehicular information 80 preferably includes at least a vehicle speed. Although the vehicular information 80 including the vehicle speed 81 may be obtained by sensors within the mobile device 28 such as an acceleration sensor (not shown), the vehicular information 80 including the vehicle speed 81 can be obtained with more accuracy by sensors within the vehicle 10 such as a wheel speed sensor (not shown), which allows the driver 50 to drive the vehicle 10 more safely. With the mobile display part 74 of the mobile device 28 being configured to display the vehicular information 80 including the vehicle speed 81, the mobile device 28 can be disposed in the position between the driver 50 of the vehicle 10 and the vehicular display part 26a of the vehicle on-board unit 26, i.e. in front of the vehicular display part 26a.

The mobile device 28 shown in FIG. 1 has an imaging unit (camera unit) 71 for picking up an image and recognizes the positions of the eyes 51 (FIG. 2) of the driver 50 and a reference position from the image picked up by the imaging unit 71.

In the illustrated embodiment, the mobile device 28 having the mobile display part 74 is, for example, a tablet device. The tablet device is, generally, compact and thin. As the mobile device 28, the tablet device is easy to carry and easy to set on the vehicle 10. Also, the mobile device 28 may be a PDA (personal digital assistant) or a smart phone. Recently, these mobile devices having a camera unit are sold at low prices. By using the mobile device 28, the manufacturing cost of the vehicular display system 100 can be reduced.

Further, the mobile display part 74 of the mobile device 28 is controlled by the mobile device 28 itself, more specifically, on an OS (operating system) level of, for example, the tablet device. Thus, there is no need for such a special programming required in JP 2011-111123A, and therefore the mobile display part 74 can be readily controlled by simply controlling output on an application level.

In FIG. 1, reference characters Fr, Rr, R and L denote respectively "front", "rear", "right" and "left", which are used to refer to directions of the vehicle 10 with respect to the driver 50 or the driver's seat 18. The mobile display part 74 shown in FIG. 1 is disposed on an opposite side (i.e., located forwardly) of the driver's seat 18 with respect to a steering wheel 14 of the vehicle 10. In other words, the predetermined position where the mobile device 28 is disposed is present on the opposite side of the driver 50 with respect to the steering wheel 14.

FIGS. 2A and 2B show the mobile device 28 which is disposed in different positions.

In FIG. 2A, which shows the mobile device 28 disposed in a first position, when the vehicle 10 is viewed from the side, a line connecting the eye (point of view) 51 of the driver 50 and a lower edge of the mobile display part 74 coincides with a line passing through a top edge of the steering wheel 14 (rim 14r) and the lower edge of the mobile display part 74. Namely, the mobile device 28 is disposed in such a position that the steering wheel 14 does not get into a visual range of the driver 50 between an upper edge and the lower edge of the mobile display part 74. In this case, the maximum visual range of the driver 50 is ensured, and an entire display image displayed on the mobile display part 74 can be seen by the driver 50. This position in which the mobile device 28 is disposed is determined based on positions of the driver's seat 18 and the steering wheel 14 when the driver 50 is an average man (having an average height and an average seated height) in a country where the vehicle 10 is marketed.

In FIG. 2B, which shows the mobile device 28 disposed in a second position, when the vehicle 10 is viewed from the side, a line connecting the eye (point of view) 51 of the driver 50 and the lower edge of the mobile display part 74 does not coincide with a line (not shown) passing through the top edge of the steering wheel 14 (rim 14r) and the lower edge of the mobile display part 74. Namely, the mobile device 28 is disposed in such a position that the steering wheel 14 gets into the visual range of the driver 50 between the upper edge and the lower edge of the mobile display part 74. In this case, the visual range of the driver 50 is narrowed, and part of the display image displayed on the mobile display part 74 cannot be seen by the driver 50.

Figure 4:
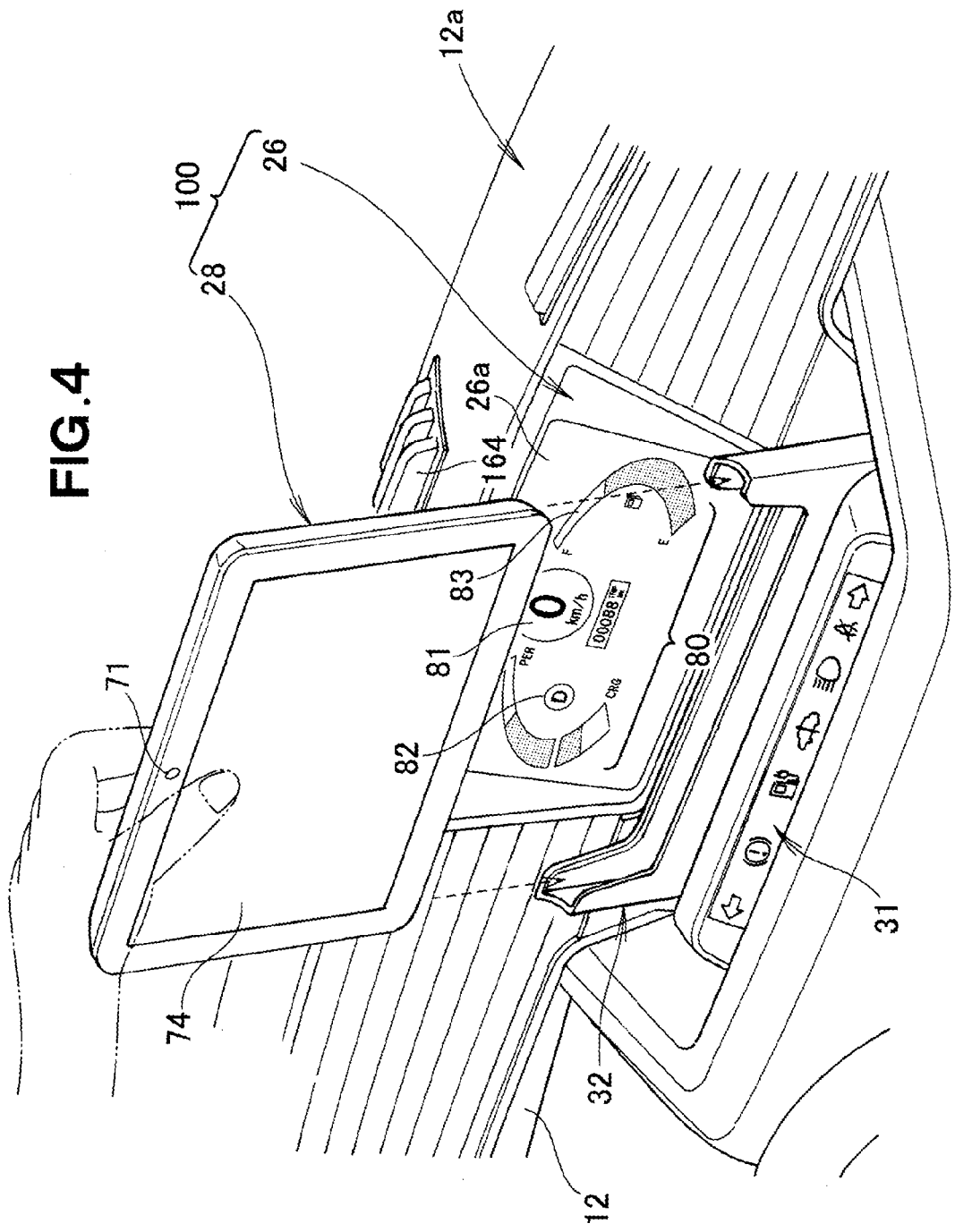
FIG. 4 is a view showing how the mobile device is disposed in the vehicle.

The display image displayed on the mobile display part 74 shown in FIGS. 2A and 2B contains, for example, the vehicular information (vehicular content) 80 which is normally displayed on the vehicular display part 26a shown in FIG. 4.

Figure 3B:
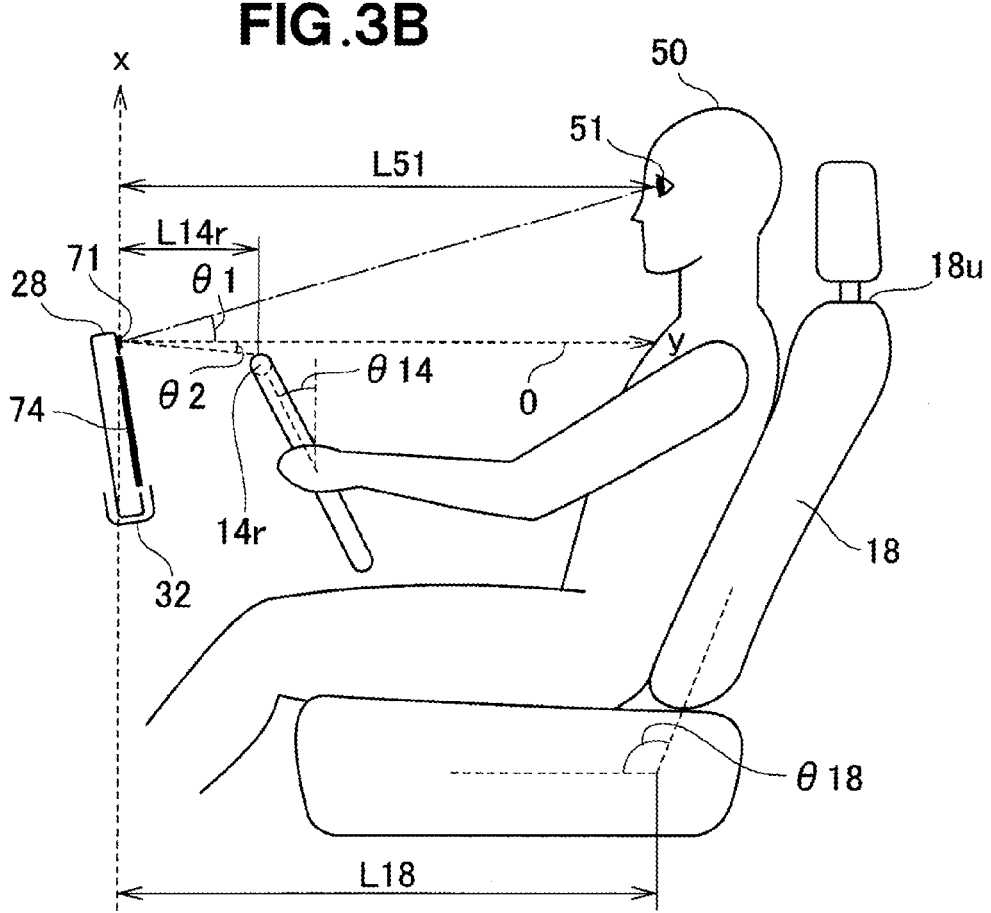
FIG. 3B is a side view showing positional relationships between the imaging unit of the mobile device, the steering wheel, the driver's eyes, and a driver's seat.

FIG. 3A shows an example of the image picked up by the imaging unit 71 of the mobile device 28, and FIG. 3B shows positional relationships between the imaging unit 71 of the mobile device 28, the steering wheel 14, the driver's eyes 51, and the driver's seat 18. The mobile device 28 recognizes a feature point of a face of the driver 50 from the image, and extracts the eyes 51 of the driver 50 to identify the positions (height) of the driver's eyes 51. The mobile device 28 then identifies the reference position (height) in the vehicle 10. More specifically, the mobile device 28 recognizes, for example, a feature point of a seat back of the driver's seat 18 from the image, and extracts an upper edge 18u of the seat back to identify a position (height) of the upper edge 18u of the seat back as the reference position (height). The top edge of the rim 14r of the steering wheel 14 may be used as the reference position in the vehicle 10 instead of the upper edge 18u of the seat back.

However, the positions of the upper edge 18u of the seat back of the driver's seat 18 and the top edge of the rim 14r of the steering wheel 14 are variable (i.e., not fixed). Namely, an angle (opening angle θ18 in FIG. 3B) and a position (seat position represented by a distance L18) of the seat back of the driver's seat 18 are adjustable, and an angle (tilt angle θ14) and a position (telescopic position represented by a distance L14r) of the steering wheel 14 are also adjustable. It is preferred that the reference position in the vehicle 10 should be an invariable position, i.e. a fixed position, which does not change due to an operation by the driver 50. For example, an upper edge 23u or a lower edge 23d of a rear window 23, a heating wire (not shown) extending horizontally on the rear window 23, and a position (horizontal position) in a horizontal plane O parallel to a horizontal line passing through the center of the imaging unit 71 or an imaging element in the imaging unit 71 can be used as the fixed reference positions in the vehicle 10.

As noted above, the imaging unit 71 of the mobile device 28 is fixed in position via the holder 32 that holds the mobile device 28. Therefore, although the positions of the upper edge 18u of the seat back of the driver's seat 18 and the top edge of the rim 14r of the steering wheel 14 are variable, the mobile device 28 can obtain an adjusted position of the upper edge 18u of the seat back of the driver's seat 18 based on fixed positions of background objects in the vehicle 10, such as a B-pillar 22 in the image shown in FIG. 3A. Also, since a horizontal width of the upper edge 18u of the seat back of the driver's seat 18 and a vertical width of the top edge of the rim 14r of the steering wheel 14 are known, the mobile device 28 can obtain adjusted positions of the upper edge 18u of the seat back of the driver's seat 18 and the top edge of the rim 14r of the steering wheel 14 from the image picked up by the imaging unit 71.

Alternatively, the mobile device 28 may obtain the adjusted position of the upper edge 18u of the seat back of the driver's seat 18 from the angle (opening angle θ18) and the position (seat position represented by the distance L18) of the seat back of the driver's seat 18 which are controlled by a seat ECU (electronic control unit). Also, the mobile device 28 may obtain the adjusted position of the top edge of the rim 14r of the steering wheel 14 from the angle (tilt angle θ14) and the position (telescopic position represented by the distance L14r) of the steering wheel 14 which are controlled by a tilt/telescopic ECU. Thus, the variable reference positions in the vehicle 10 as well as the fixed reference positions in the vehicle 10 are known.

The position where the mobile device 28 is disposed is set or adjusted to the first position or the second position described above (see FIGS. 2A and 2B). In other words, the position of the mobile device 28 (mobile display part 74), the position of the steering wheel 14, and the reference positions in the vehicle 10 are known. The mobile device 28 can therefore grasp whether or not the mobile display part 74 is obstructed from view by the steering wheel 14 (i.e., can obtain an obstructed region and an obstructing line that indicates an upper edge of the obstructed region) when the mobile display part 74 is viewed from the positions of the driver's eyes 51, based on the positions of the driver's eyes 51, the known reference positions (for example, the upper edge 18u of the seat back of the driver's seat 18 and the horizontal plane O), the position of the mobile device 28, and the position of the steering wheel 14 (top edge of the rim 14r of the steering wheel 14).

In other words, by determining, for example, a distance between the positions of the driver's eyes 51 and the horizontal plane O (as the reference position in the vehicle 10), and a distance between the position of the top edge of the rim 14r of the steering wheel 14 and the horizontal plane O (as the reference position in the vehicle 10), the mobile device 28 can grasp whether or not the mobile display part 74 is obstructed from view by the steering wheel 14 (i.e., can obtain the obstructed region or the obstructing line) when the mobile display part 74 is viewed from the positions of the driver's eyes 51.

In FIG. 3B, the distance between the positions of the driver's eyes 51 and the horizontal plane O (y-axis in the side view) is obtained from a distance L51 between the positions of the driver's eyes 51 and a vertical plane (x-axis in the side view) that is perpendicular to the horizontal line passing through the center of the imaging unit 71 or the imaging element in the imaging unit 71, and an angle (elevation angle) θ1 formed by a line extending from the imaging unit 71 to the driver's eyes 51 and the horizontal plane O. Namely, the mobile device 28 may simply obtain the distance between the positions of the driver's eyes 51 and the horizontal plane O based only on the elevation angle θ1. Alternatively, the mobile device 28 may obtain the distance between the positions of the driver's eyes 51 and the horizontal plane O from the elevation angle θ1 and the distance L18 instead of the distance L51.

Similarly, the distance between the position of the top edge of the rim 14r of the steering wheel 14 and the horizontal plane O is obtained from the distance L14r between the position of the top edge of the rim 14r and the vertical plane (x-axis in the side view), and an angle (depression angle) θ2 formed by a line extending from the imaging unit 71 to the top edge of the rim 14r and the horizontal plane O. Namely, the mobile device 28 may simply obtain the distance between the position of the top edge of the rim 14r and the horizontal plane O based only on the depression angle θ2.

In the illustrated embodiment, the mobile device 28 has an inclination sensor such as a triaxial acceleration sensor (not shown) for detecting acceleration in a horizontal direction (y-axis direction) or a gravity direction (x-axis direction). The mobile device 28 may use the inclination sensor together with the image picked up by the imaging unit 71 to obtain the elevation angle θ1 and the depression angle θ2 with respect to the horizontal plane O.

In FIG. 4, the driver 50 is setting the mobile device 28 onto the vehicle 10 by inserting a lower portion of the mobile device 28 into a recess of the holder 32, whereby the mobile device 28 is disposed in the predetermined position in the vehicle 10.

The vehicle on-board unit 26 having the vehicular display part 26a is fixedly mounted on the vehicle 10 as shown in FIG. 4, and includes, for example, a meter unit. More specifically, the vehicle on-board unit (meter unit) 26 is embedded within a meter panel 12a, and the meter panel 12a is fixed to an instrumental panel 12 (see also FIG. 1). The meter panel 12a and the instrumental panel 12 together constitute a dashboard. Although the dashboard is thus formed by a combination of the meter panel 12a and the instrumental panel 12, the dashboard may be formed by a single member. In other words, the meter panel 12a may be omitted, and the vehicle on-board unit 26 having the vehicular display part 26a may be fixed to the instrumental panel 12 or the dashboard.

When the mobile device 28 is disposed in the position between the driver 50 (or driver's seat 18) and the vehicle on-board unit 26 (or vehicular display part 26a) as shown in FIG. 1, the mobile display part 74 of the mobile device 28 is configured to display the vehicular information 80 including the vehicle speed 81 which is displayed normally on the vehicular display part 26a.

The vehicle 10 includes a warning indicator 31, as shown in FIG. 4, which is configured to display warning lights such as a seatbelt warning light, a vehicle system warning light, a battery warning light, and a brake warning light. When the vehicle 10 does not have the warning indicator 31, the vehicular display part 26a may be configured to display these warning lights. The warning indicator 31 shown in FIG. 4 further includes lighting state indicator lights for direction indicator lights and head lamps.

Figure 5A:
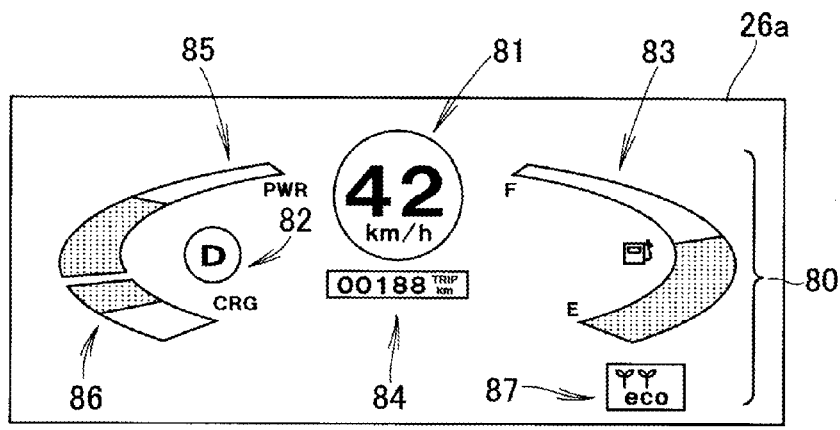
FIG. 5A is a plan view showing a display screen of a vehicle on-board unit of the vehicular display system.

FIG. 5A shows a display screen of the vehicle on-board unit 26, i.e. a display image displayed on the vehicular display part 26a of the vehicle on-board unit 26. As shown in this figure, the vehicular display part 26a of the vehicle on-board unit 26 is configured to display on the display screen the vehicular information 80 including, as well as the vehicle speed (speed meter) 81, a shift position meter 82 (shown by "D", for example), a battery meter 83, an odometer/trip meter 84, a power meter 85, a regeneration meter 86, and an eco meter 87.

Although the vehicle 10 shown in FIG. 1 is an electric vehicle, the vehicle 10 may be a gasoline vehicle, and, in the gasoline vehicle, the display screen of the vehicular display part 26a shown in FIG. 5A may indicate a gasoline meter instead of the battery meter 83.

Figure 5B:
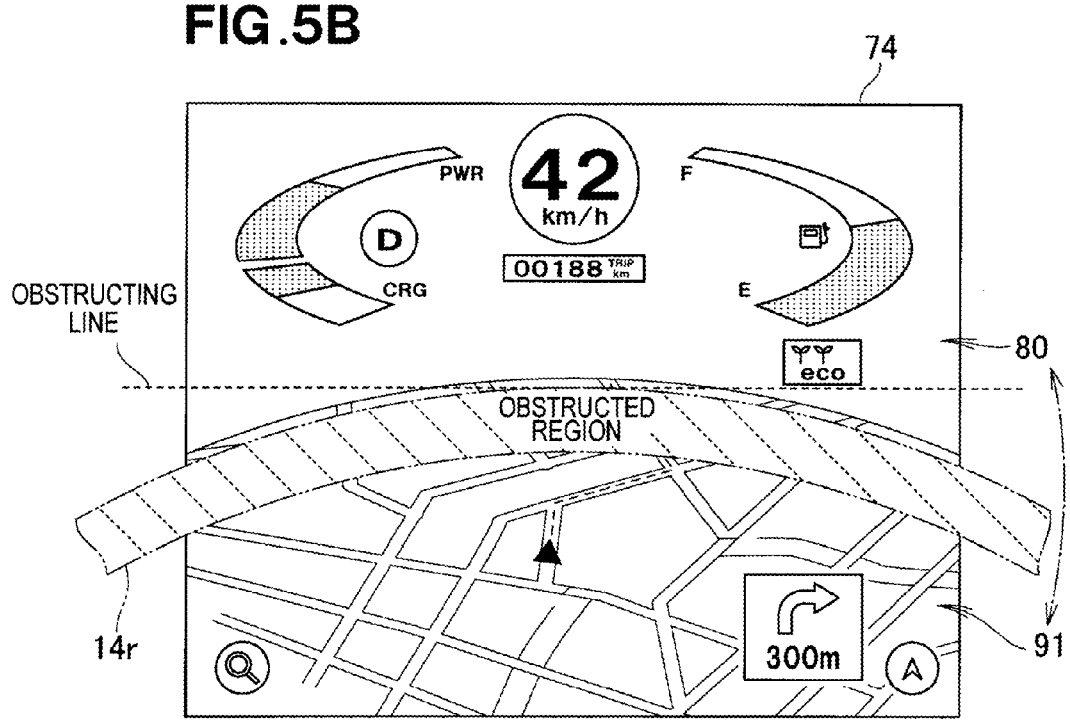
FIG. 5B is a plan view showing a display screen of the mobile device.

FIG. 5B shows a display screen of the mobile device 28, i.e. a display image displayed on the mobile display part 74 of the mobile device 28. As shown in this figure, the mobile display part 74 of the mobile device 28 is configured to display on the display screen the vehicular information 80 including at least the vehicle speed (speed meter) 81 displayed normally on the vehicular display part 26a, and the vehicular information 80 preferably also includes the other vehicular information 82 to 87. Namely, when the mobile display part 74 of the mobile device 28 is disposed in the position between the driver 50 and the vehicular display part 26a, it is preferred that the driver 50 should be able to obtain substantially all of the vehicular information 80 displayed normally on the vehicular display part 26a by looking the mobile display part 74 instead of the vehicular display part 26a.

When the mobile display part 74 has a smaller display size or resolution than the vehicular display part 26a, part of the vehicular information 80 to be displayed on the mobile display part 74 may be omitted. In other words, it is preferred that the mobile display part 74 should have a larger display size or resolution than the vehicular display part 26a so that the mobile display part 74 can also display mobile information 91 produced independently by the mobile device 28, concurrently with substantially all of the vehicular information 80 displayed normally on the vehicular display part 26a. By looking the mobile display part 74, the driver 50 can also obtain the mobile information 91 including, for example, navigation information. The vehicular information (vehicular content) 80 including the vehicle speed 81 and the mobile information (mobile content) 91 including the navigation information are displayed and managed unitarily on the mobile display part 74 in this manner, thereby minimizing movement of the sight of the driver 50 and allowing the driver 50 to concentrate on driving the vehicle 10.

The mobile device 28 has a navigation application for navigating the vehicle 10 to a destination along a suitable traveling route, and the navigation application produces a display image containing the navigation information as the mobile information 91 (shown in a lower part of FIG. 5B). The navigation application or an integrated application on the mobile device 28 can receive the display image containing the vehicular information 80 produced by the vehicle on-board unit 26, and produce an integrated display image displaying concurrently the vehicular information (vehicular content) 80 and the mobile information (mobile content) 91, as shown in FIG. 5B. Alternatively, the navigation application or the integrated application on the mobile device 28 may receive the raw vehicular information 80 from the vehicle on-board unit 26, and produce a display image of the vehicular information (vehicular content) 80 and a display image of the mobile information (mobile content) 91 to further produce an integrated display image displaying concurrently the vehicular information (vehicular content) 80 and the mobile information (mobile content) 91.

As shown in FIG. 5B, the integrated display image displayed on the mobile display part 74 is composed of two image parts displayed respectively on upper and lower regions of the mobile display part 74. The upper image part of the integrated display image (displayed on an upper side of the obstructed region or obstructing line) corresponds to the vehicular information (vehicular content) 80, and the lower image part (displayed on a lower side of the obstructed region or obstructing line) corresponds to the mobile information (mobile content) 91.

In FIG. 5B, an outline of the rim 14r of the steering wheel 14 is depicted by an imaginary line. When the steering wheel 14 and the mobile display part 74 are viewed from the driver's seat 18 (FIG. 1), the vehicular information 80 is located on an outer side of the steering wheel 14, and the mobile information 91 is located on an inner side of the steering wheel 14. A region of the mobile display part 74 on the inner side of the steering wheel 14 is defined by the rim 14r of the steering wheel 14, and it might be hard to see the mobile information 91 located on the inner side of the steering wheel 14 because of the steering wheel 14 in front of the mobile display part 74. Conversely, the vehicular information 80 located on the outer side of the steering wheel 14 (i.e., upper side of the obstructed region) is free from being blocked by the steering wheel 14. Therefore, the vehicular information 80 including the vehicle speed 81 is located on the outer side of the steering wheel 14 (upper side of the obstructed region), so that the driver 50 can see more clearly the vehicular information 80.

The integrated display image shown in FIG. 5B may be modified to have the upper image part corresponding to the mobile information (mobile content) 91 and the lower image part corresponding to the vehicular information (vehicular content) 80. That is, the locations of the vehicular information 80 and the mobile information 91 are optionally determined with respect to the steering wheel 14 (i.e., obstructed region or obstructing line), so that the driver 50 can easily see and obtain both the vehicular information 80 and the mobile information 91.

If the integrated display image displayed on the mobile display part 74 is composed of two image parts displayed respectively on left and right regions of the mobile display part 74, the driver 50 might be unable to see part of the vehicular information 80 and the mobile information 91 depending on the position in which the mobile device 28 is disposed.

When the mobile device 28 is disposed in the position between the driver 50 and the vehicular display part 26a as shown in FIG. 1, the driver 50 cannot see the vehicular display part 26a. The vehicular display part 26a can thus be turned off to thereby suppress the power consumption of a vehicle battery (not shown).

Figure 6A:
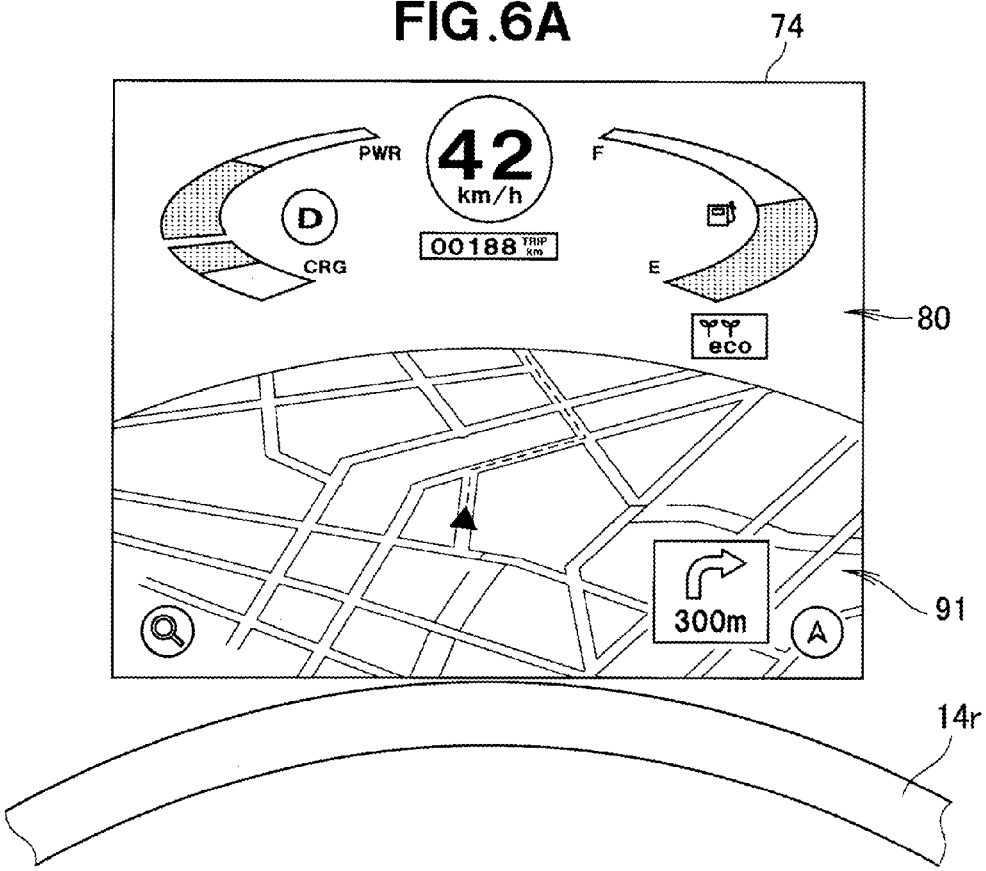
FIGS. 6A and 6B are plan views showing how the display screen of the mobile device of FIG. 2A is viewed from eyes of a driver of average height and eyes of a driver of small height, respectively.
Figure 6B:
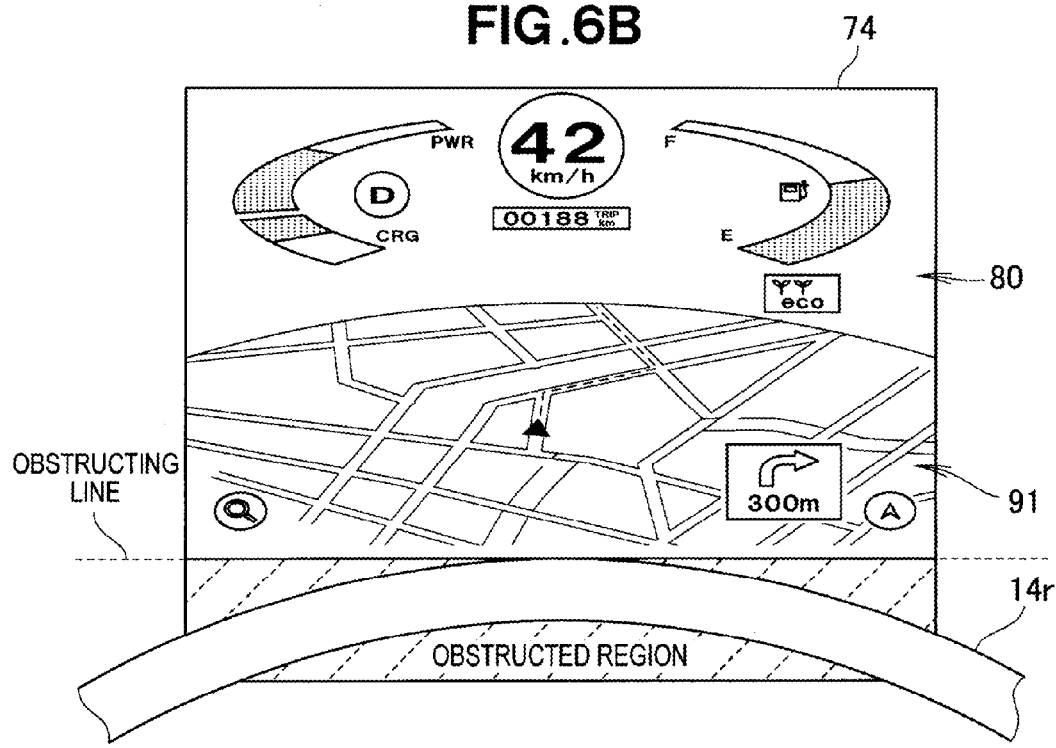

FIGS. 6A and 6B are plan views showing how the display screen of the mobile device 28 of FIG. 2A is viewed from the eyes 51 of the driver 50 of average height and eyes of a driver of small height, respectively. In FIG. 6A, when the mobile device 28 disposed in the first position as shown in FIG. 2A is viewed from the eyes 51 of the driver 50 of average height, the lower edge of the mobile display part 74 almost coincides with the top edge of the rim 14r of the steering wheel 14. Namely, the mobile device 28 is disposed in such a position that the steering wheel 14 does not get into the visual range of the driver 50 of average height between an upper edge and the lower edge of the mobile display part 74. In this case, the maximum visual range of the driver 50 of average height is ensured, and there is no need to change the display size and the display position of each of the contents 80, 91 displayed on the mobile device 28.

The driver 50 shown in FIGS. 2A and 3A is the average driver of average height. Positions of the eyes of the small-height driver are lower than the positions of the eyes 51 of the average driver 50. It should be noted that, however, the positions of the eyes of the small-height driver as well as the positions of the eyes 51 of the average driver 50 are expected to be higher than the reference positions in the vehicle 10, such as the upper edge 18u of the seat back of the driver's seat 18 and the horizontal plane O, as shown in FIG. 3A. When the small-height driver is sitting on the driver's seat 18, the positions of the eyes of the small-height driver are closer to the horizontal plane O than the positions of the eyes 51 of the average driver 50. Further, an elevation angle formed by the horizontal plane O and a line extending to the eyes of the small-height driver is smaller than the elevation angle θ1 formed by the horizontal plane O and the line extending to the eyes 51 of the average driver 50. In this case, as shown in FIG. 6B, the obstructed region is relatively large and the obstructing line is relatively high, and therefore the display size of each of the contents 80, 91 shown in FIG. 6B is changed to be smaller than the display size of each of the contents 80, 91 shown in FIG. 6A. As a result, the small-height driver can easily see the contents 80, 91.

Figure 7A:
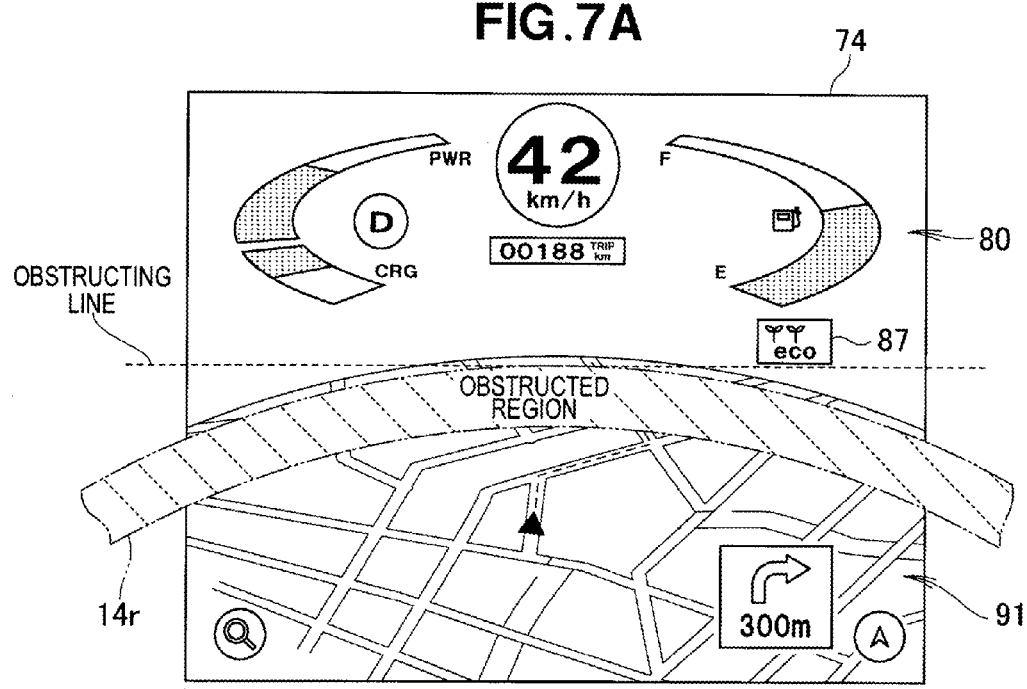
FIGS. 7A and 7B are plan views showing how the display screen of the mobile device of FIG. 2B is viewed from the eyes of the driver of average height and the eyes of the driver of small height, respectively.
Figure 7B:
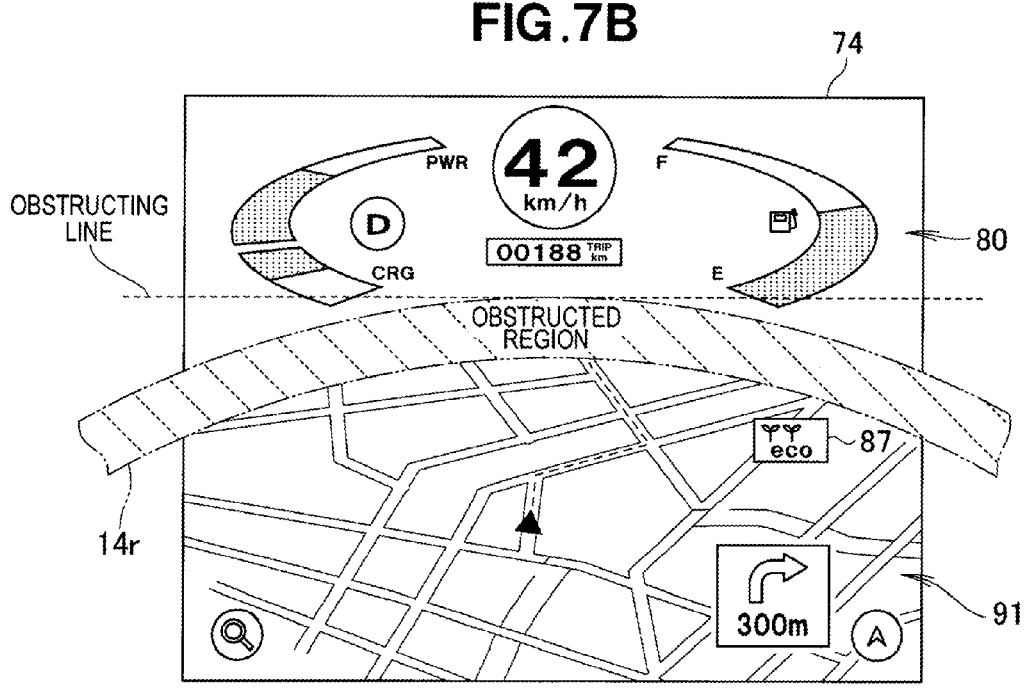

FIGS. 7A and 7B are plan views showing how the display screen of the mobile device 28 of FIG. 2B is viewed from the eyes 51 of the average driver 50 and the eyes of the small-height driver, respectively. In FIG. 7A, when the mobile device 28 disposed in the second position as shown in FIG. 2B is viewed from the eyes 51 of the average driver 50, a horizontal centerline between the upper and lower edges of the mobile display part 74 almost coincides with the obstructing line that indicates the upper edge of the obstructed region obstructed from view by the rim 14r of the steering wheel 14. In other words, the horizontal centerline between the upper and lower edges of the mobile display part 74 can be considered as the obstructed region or obstructing line, and the contents 80, 91 can be divided to be displayed respectively on the upper side and the lower side with respect to the obstructed region or obstructing line.

As described above, the positions of the eyes of the small-height driver are lower than the positions of the eyes 51 of the average driver 50. Further, as shown in FIG. 7B, when the mobile device 28 disposed in the second position as shown in FIG. 2B is viewed from the eyes of the small-height driver sitting on the driver's seat 18, the obstructed region is relatively large and the obstructing line is relatively high. In this case, a display position of the content 87 shown in FIG. 7B can be lowered than that of the content 87 shown in FIG. 7A, thereby allowing the small-height driver to easily see the content 87.

Figure 8A:
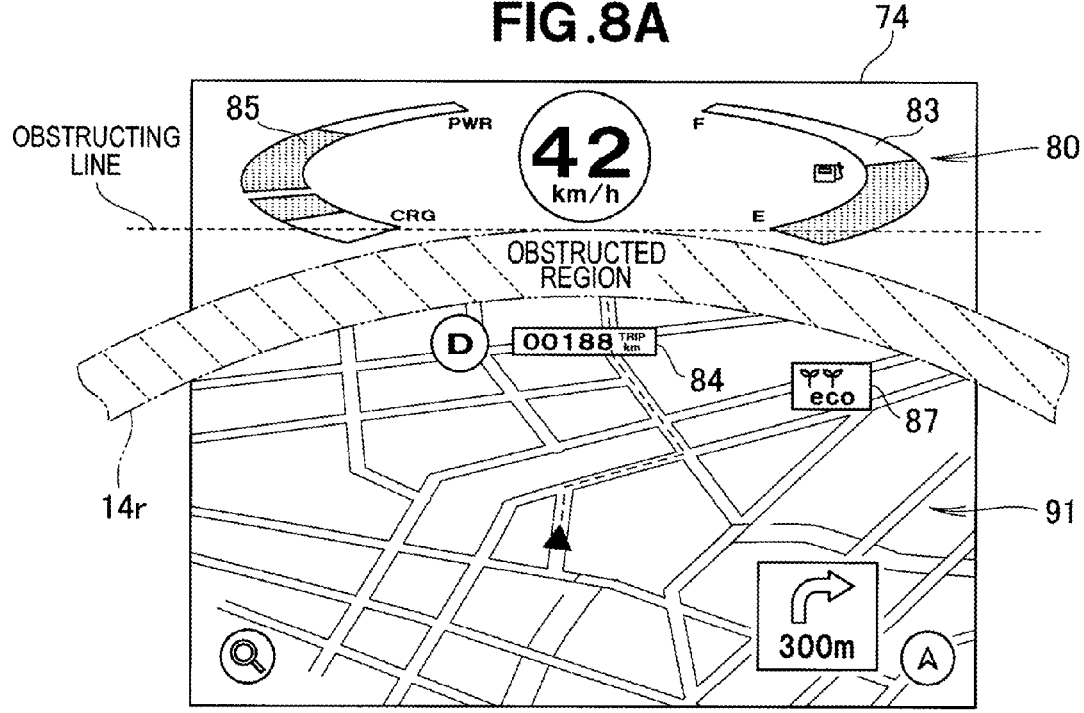
FIGS. 8A and 8B are plan views of the display screen of the mobile device displaying alternative display images.
Figure 8B:
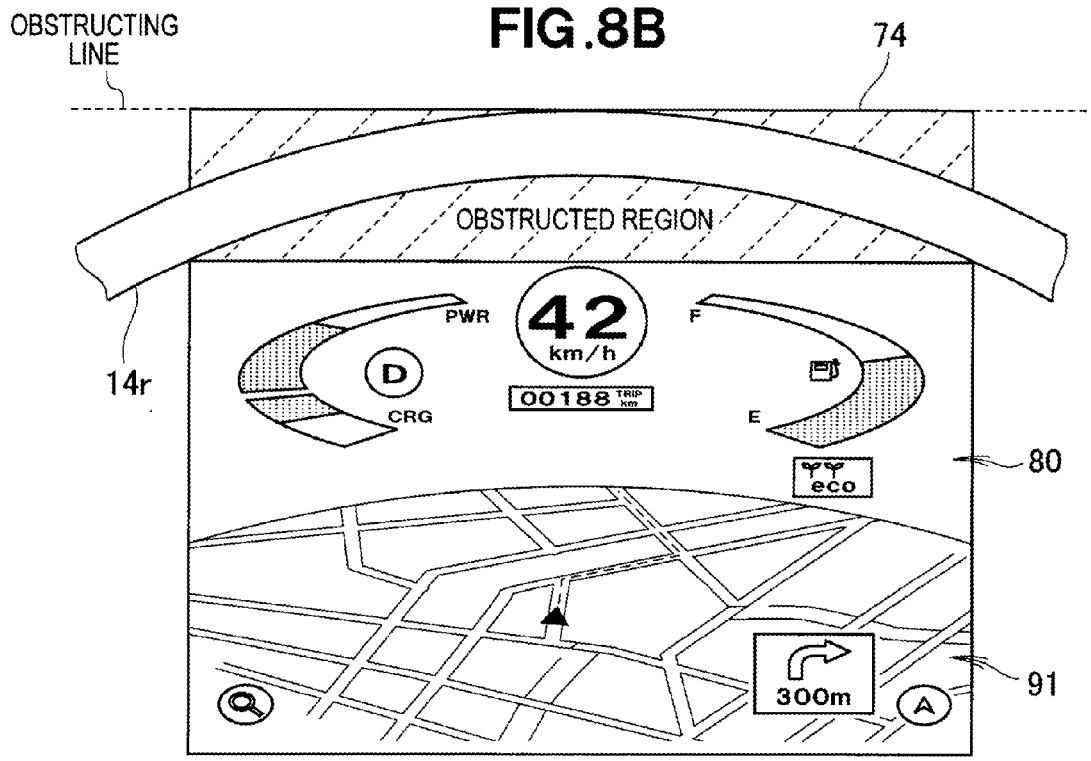

FIGS. 8A and 8B are plan views of the display screen of the mobile device 28 displaying alternative display images. In the case shown in FIG. 7B, when the angle (tilt angle θ14) of the steering wheel 14 is reduced and the depression angle θ2 representing the position of the steering wheel 14 is also reduced, the obstructed region or obstructing line gets higher, as shown in FIG. 8A. In this case, a display position of the content 84 shown in FIG. 8A can also be lowered than that of the content 84 shown in FIG. 7B. Further, display sizes of the contents 83 and 85 shown in FIG. 8A can be reduced than those of the contents 83 and 85 shown in FIG. 7B. As a result, the contents 83, 84 and 85 can be seen easily even when the depression angle θ2 is reduced.

In the case shown in FIG. 8A, when the position (telescopic position) of the steering wheel 14 is changed to increase the distance L14r and the depression angle θ2 representing the position of the steering wheel 14 is further reduced, the obstructing line gets further higher and the obstructed region gets larger, as shown in FIG. 8B. In this case, the display sizes of the contents 80, 91 shown in FIG. 8B can be reduced than those of the contents 80, 91 shown in FIG. 8A. As a result, the contents 80, 91 can be seen easily even when the depression angle θ2 is further reduced.

In this manner, the mobile device 28 can control the display size and the display position of the whole or part of the contents 80, 91 such that the display size is reduced and the display position is lowered as the positions of the eyes 51 of the driver 50 become closer to the reference position such as the horizontal plane O shown in FIG. 3A. Similarly, the mobile device 28 can control the display size and the display position of the whole or part of the contents 80, 91 such that the display size is reduced and the display position is lowered as the position of the top edge of the rim 14r of the steering wheel 14 becomes closer to the reference position such as the horizontal plane O.

Figure 9:
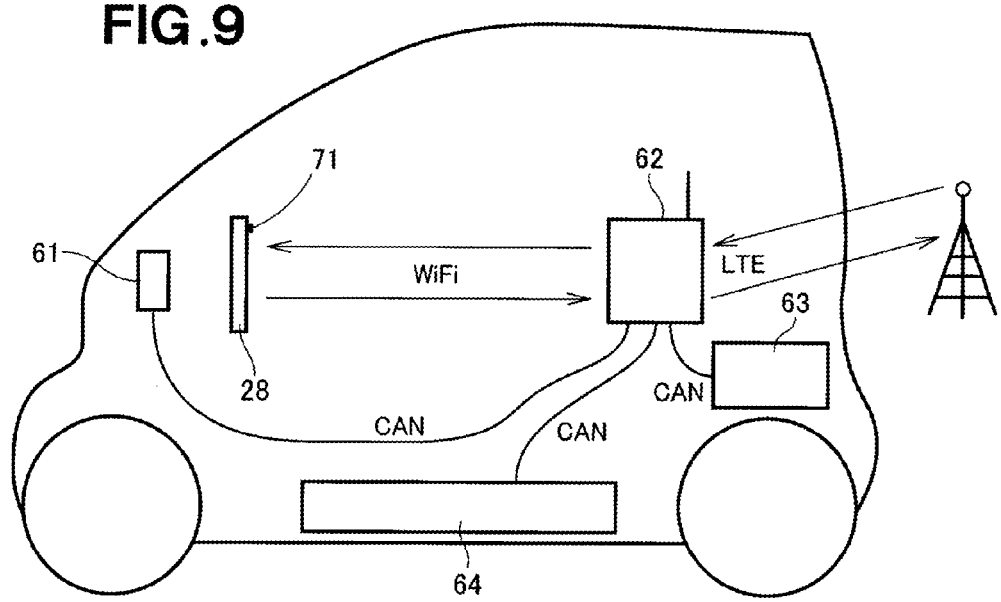
FIG. 9 is a schematic view showing a configuration example of an automotive communication network.

The following is a description of an automotive communication network of the vehicular display system 100. As shown in FIG. 9, the vehicle on-board unit (meter unit) 26 shown in FIG. 4 includes a meter ECU 61. The meter ECU 61 produces a display image (display signal) of the vehicular information 80, and outputs the display image to the vehicular display part 26a, as shown in FIG. 5A. The meter ECU 61 is connected to the automotive communication network such as a CAN (controller area network). Further, the vehicle 10 includes a communication unit 62, a motor ECU 63, and a battery ECU 64, which are connected to the CAN.

In FIG. 9, the meter ECU 61 can receive information from the motor ECU 63 via the CAN, such as the vehicle speed obtained by the wheel speed sensor (not shown). The motor ECU 63 handles various items of information including the vehicle speed, a shift position, and an accelerator position, for example. The motor ECU 63 controls the power of a motor (not shown), which is a power source of the vehicle 10, and outputs the information including a current motor power, the vehicle speed, and the shift position to the meter ECU 61 in real time. Although the vehicle 10 is an electric vehicle, the vehicle 10 may be a gasoline vehicle, and the gasoline vehicle 10 may include a FI (fuel injection) ECU instead of the motor ECU 63. The FI ECU handles various items of information including the vehicle speed, the shift position, and the accelerator position, for example, controls fuel injection amount of an engine as a power source of the gasoline vehicle 10, and outputs the information including a current engine speed, the vehicle speed, and the shift position to the meter ECU 61 in real time.

The battery ECU 64 shown in FIG. 9 handles information including a residual capacity and a charged capacity of the vehicle battery (not shown). The battery ECU 64 controls charging and discharging of the vehicle battery, and outputs the above information to the meter ECU 61 in real time. The vehicle battery can be charged from an external charging stand (not shown) via a charging cable (not shown), and the vehicle 10 has a charging state indicator 164 (FIG. 1) which can be seen from outside the vehicle 10 and indicates a charging state of the vehicle battery. The battery ECU 64 controls the charging state indicator 164 as well.

The communication unit 62 includes a Wi-Fi (Wireless Fidelity) communication module (not shown) and a CAN communication module (not shown), for example, and is capable of sending to the mobile device 28 by wireless the display image (display signal) of the vehicular information (vehicular content) 80 (FIG. 5A) via the meter ECU 61. It is preferred that the meter ECU 61 (vehicle on-board unit 26) and the mobile device 28 should be connected wirelessly in this manner, and the mobile device 28 can thereby receive the display image (display signal) of the vehicular information 80 from the meter ECU 61. Note that the mobile device 28 may receive only the vehicular information 80 from the meter ECU 61 if the mobile device 28 is configured to produce the display image (display signal) from the vehicular information 80.

By wirelessly connecting the vehicle on-board unit 26 and the mobile device 28, the mobile device 28 can readily receive the vehicular information 80 (as the raw vehicular information 80 or as the display image of the vehicular information 80) from the vehicle on-board unit 26. Conversely, if the vehicle on-board unit 26 and the mobile device 28 are connected by wire or cable, the driver 50 has to manually connect the vehicle on-board unit 26 and the mobile device 28 to set the mobile device 28 on the vehicle 10, which would be troublesome for the driver 50.

In FIG. 9, the communication unit 62 includes an LTE (long term evolution) communication module (not shown) by which the communication unit 62 is capable of connecting to a mobile phone communication network. The communication unit 62 can access to information outside the vehicle 10, such as Internet information, via the mobile phone communication network. With this configuration, the navigation application on the mobile device 28 can receive the information outside the vehicle 10 as necessary to thereby produce or update the display image of the mobile information (navigation information) 91 as shown in FIG. 5B.

The communication unit 62 shown in FIG. 9 may be modified to include a Bluetooth communication module (not shown) so that the meter ECU 61 (vehicle on-board unit 26) and the mobile device 28 are connected wirelessly by Bluetooth communication ("Bluetooth" is a registered trademark for a wireless communication technology). Instead of or additionally to the above-described LTE communication module of the communication unit 62, the mobile device 28 may include therewithin a mobile phone communication module (not shown), such as a 3G communication module (not shown). In that case, for example, the navigation application on the mobile device 28 can receive via the 3G communication module the information outside the vehicle 10 as necessary.

The vehicular display system of the present invention is well suited for use in automotive vehicles provided with a display device for displaying information to a driver or any other vehicle occupant.

Obviously, various minor changes and modifications of the present invention are possible in light of the above teaching. It is therefore to be understood that within the scope of the appended claims the invention may be practiced otherwise than as specifically described.

What is claimed is:

1. A vehicular display system comprising:
   a mobile device having a mobile display part and an imaging unit for picking up an image, the mobile device is adapted to be disposed in a predetermined position in a vehicle, wherein the mobile display part is configured to display contents such that at least one of a display size and a display position of each of the contents is changed in accordance with positions of eyes of a driver sitting on a driver's seat in the vehicle with respect to a reference position in the vehicle, the reference position in the vehicle and the positions of the eyes of the driver in the vehicle are determined based on the reference position from the image and the positions of the eyes of the driver from the image, and wherein the predetermined position where the mobile device is disposed is present on an opposite side of the driver with respect to a steering wheel of the vehicle, and wherein said at least one of the display size and the display position of each of the contents is changed on the basis of whether or not the mobile display part is obstructed from view by the steering wheel when the mobile display part is viewed from the positions of the driver's eyes.

2. The vehicular display system of claim 1, further comprising:

a vehicle on-board unit fixedly mounted on the vehicle, wherein the contents comprise a vehicular content representing vehicular information collected by the vehicle on-board unit, and a mobile content representing mobile information produced independently by the mobile device, and wherein the at least one of the display size and the display position of each of the contents is changed such that the vehicular content is displayed on one of an upper side and a lower side of an obstructing line where the mobile display part is obstructed from view by the steering wheel, and the mobile content is displayed on the other of the upper side and the lower side of the obstructing line.

3. The vehicular display system of claim 2, wherein the vehicular content is displayed on the upper side of the obstructing line, and the mobile content is displayed on the lower side of the obstructing line.

4. The vehicular display system of claim 1, wherein the reference position is to be lower than the positions of the driver's eyes, and wherein the at least one of the display size and the display position of each of the contents is changed such that the display size is reduced or the display position is lowered as the positions of the driver's eyes become closer to the reference position.

\* \* \* \* \*